UNITED STATES PATENT OFFICE.

SIDNEY G. THOMAS, OF QUEEN'S ROAD VILLAS, COUNTY OF SURREY, ENGLAND.

IMPROVEMENT IN THE MANUFACTURE OF REFRACTORY FURNACE-LININGS AND REFRACTORY BRICKS.

Specification forming part of Letters Patent No. 218,336, dated August 5, 1879; application filed March 1, 1879.

*To all whom it may concern:*

Be it known that I, SIDNEY GILCHRIST THOMAS, of Queen's Road Villas, in the county of Surrey, England, have invented new and useful Improvements in the Manufacture of Refractory Furnace-Linings and Refractory Bricks, which are fully described in the following specification.

This invention relates to an improved compound to be used for the manufacture of refractory basic bricks and for lining Bessemer converters, open-hearth, steel, and other furnaces, especially those employed in the manufacture of iron and steel. For this purpose I use a mixture of newly-burnt lime with tar.

The lime that I have found most advantageous to use is made from a magnesian limestone (the more magnesia it contains the better) containing before calcination from five to seven per cent. of silica, and from three (3) to four (4) per cent. alumina and oxide of iron together. The best results are obtained when the alumina and oxide of iron are present in about equal proportions. The silica may be present within the limits of from two and one-half to nine per cent., while the alumina and oxide of iron may be from one and one-half to five per cent.

I have found limestone containing the following composition excellent, viz: six per cent. of silica, two per cent of alumina, and one and a half (1.5) of oxide of iron, the magnesia being to the lime in the proportion of two parts of magnesia to three of lime.

It is very desirable that the amount of silica should not exceed twice the quantity of oxide of iron and alumina together present. If oxide of iron is present in large proportion, say four or five per cent., the silica and alumina should be very low. It is also very desirable that the calcination of the limestone should have been conducted at a very high heat, much higher than that ordinarily obtained in a limekiln, but such as may be obtained by calcining the limestone in kilns having fire-places of very large area, the bottom of the kilns being covered with a layer of limestone, and the limestone being loosely stacked, so as not to touch the walls of the kilns. The best plan, however, is to line the kiln throughout with my basic bricks and cement after enough bricks have been made for this purpose. By calcining at a very high heat a dense hard-shrunk lime is obtained very suitable for my purpose.

"Waster" bricks or blocks of lime accidentally produced in the manufacture of the basic bricks described in the specification of a patent for which I have already made application may be used for grinding up with other lime, though I much prefer to use highly-burned magnesian lime, as described. When this is not readily procurable ordinary well burned lime containing about three (3) to nine (9) per cent. of silica and three (3) to five (5) per cent. of alumina and oxide of iron together may be used, especially if it contains a considerable amount of magnesia, either by itself or in admixture with hard-shrunk lime, particularly for ramming furnace-hearths; or a purer magnesian lime mixed with about five per cent. of ground oxide of iron may also be used.

In all cases I prefer to mix the lime with tar directly it comes from the kiln, and preferably while still hot. If this is not possible care should be taken not to grind it till it is required for use.

The lime may with advantage be as warm as is consistent with its being readily manipulated when it is mixed with the tar.

A certain amount of magnesian limestone, preferably the alumino-silicious variety already described, may be mixed with the burned lime to improve its plasticity, and as a measure of economy.

The proportion of limestone introduced is decided by the amount of shrinkage that may be tolerated in the articles to be molded from the material. The less the amount of shrinkage allowable the less limestone (or ordinarily-burned lime) should be introduced. It is not well that the amount of limestone used should amount to more than one-half the highly-burned shrunk lime used.

The tar may be either coal-tar (which I prefer) or wood-tar. It may be either used alone or in admixture with the crude creosote of the tar-distillers (which is often cheaper than tar) in any proportion up to two parts creosote to one of tar, though I prefer to use at least one-half tar.

When a mixture of tar and creosote is used it requires sufficient heating to liquefy the creosote before it is used. The tar is also in all cases better used warm, so as to mix readily. The tar, or tar and creosote, is mixed thoroughly with the lime in a mortar-mill or otherwise, the lime being also, as I have before described, preferably warm, so as to form a slightly-moist mass, sufficiently plastic and coherent when squeezed together for the particular purpose for which it is required.

I have found the best proportions to be from six per cent. to seventeen per cent. of tar, according to circumstances. The less tar used the better, provided sufficient coherence is obtained.

To make bricks or Bessemer tuyeres, I prefer to press the mixture into the required molds under great pressure. When the pressure used is very great, from six to ten per cent. of tar will be sufficient to enable a tenacious compact material to be obtained. As a rule, the greater the pressure the better will be the brick and the less tar will be required to be used. If the pressure used is inconsiderable, from ten to seventeen per cent. of tar will generally be required to give the requisite plasticity. When great pressure has been used to prepare the bricks, they may be at once placed in the kiln without preliminary drying. When only moderate pressure has been used, the bricks should be either stove-dried or dried at a very moderate black heat in the kiln itself.

The kiln, which should have a bottom of lime or limestone, should be lined with silica bricks, the lime bricks, of course, being stacked so as not to touch the sides.

The bricks should be fired at first very gently, afterward at an intense heat, fully equal to and preferably exceeding that used in burning silica bricks.

The temperature used in burning ordinary fire-clay bricks does not give good results either in burning my present lime bricks or in preparing the hard-shrunk, highly-burned lime, which I prefer to use for their manufacture. The heat must be continued till it has penetrated throughout the whole mass of the bricks.

The cooling down of the kiln should be very slow, this being of great importance, and may be conveniently effected by not letting the fires down completely when the burning is finished, but only firing gradually less and less for some time, and then finally stopping up the kiln, as is done in burning fire-bricks.

When any admixture of unburned limestone, or lime burned at ordinary temperatures, has been used, the firing requires to be continued for a much longer period than when highly-burned lime alone has been used. The firing also requires to be more intense when the lime used is low in silica and in other binding substances. The shrinkage in the kiln will be very small indeed (generally under six per cent.) when nothing but the highly-burned shrunk lime is used, and will be less the greater the pressure. The introduction of ordinarily-burned lime or limestone, particularly the latter, largely augments shrinkage.

The bricks should be used as soon as possible after they are made, and must in all cases be kept perfectly dry. When they have to be kept at all before use, they may be dipped in or washed with liquid tar or creosote, to give them a preservative coating.

The mixture when used for forming a rammed lining is applied just as ganister lining is now rammed. A mixture with ten per cent. of tar is well suited for ramming. It is very suitable for forming the hearths of open-hearth furnaces, and may be conveniently put in in layers, as is now done with sand bottoms. I also use this mixture, with a somewhat increased proportion of tar, as a cement, in which I set these or other lime bricks. For this purpose I find it best to use only the hard-shrunk lime without any admixture of limestone with the lime.

The use of the linings and bricks herein described is of particular advantage for furnaces in which it is desired to manufacture steel and ingot iron from phosphoretic pig-iron with the production of a basic slag in the manner described in the specification of a patent for which I have already applied.

What I claim, and desire to secure by Letters Patent, is—

The manufacture and use of the mixture of lime (preferably the highly-burned and shrunk magnesian lime, as herein described) and tar or tar and creosote, used for the manufacture of refractory bricks and furnace-linings, as and for the purposes set forth.

SIDNEY GILCHRIST THOMAS.

Witnesses:
  PHILIP M. JUSTICE,
  ALLEN P. JONES.